United States Patent [19]
Johnson

[11] Patent Number: 5,222,459
[45] Date of Patent: Jun. 29, 1993

[54] AUTOMATIC TURKEY NESTING APPARATUS

[75] Inventor: William H. Johnson, Harrisonburg, Va.

[73] Assignee: Shenandoah Manufacturing Company, Inc., Harrisonburg, Va.

[21] Appl. No.: 886,089

[22] Filed: May 21, 1992

[51] Int. Cl.⁵ .................... A01K 31/17; A01K 31/16
[52] U.S. Cl. ........................... 119/45.3; 119/49
[58] Field of Search ............... 119/45.3, 45.1, 47, 119/49, 50, 50.5

[56] References Cited

U.S. PATENT DOCUMENTS

| | | | |
|---|---|---|---|
| 2,260,028 | 10/1941 | Houston | 119/49 |
| 2,564,207 | 8/1951 | Marshall | 119/47 |
| 2,992,628 | 7/1961 | McDaniel | 119/49 |
| 3,027,871 | 4/1962 | Peterson | 119/45 |
| 3,045,645 | 7/1962 | Fisher | 119/49 |
| 3,157,156 | 11/1964 | Peterson et al. | 119/45 |
| 3,164,129 | 1/1965 | Rigteriuk | 119/45.3 |
| 3,183,889 | 5/1965 | Peterson et al. | 119/45.3 |
| 3,234,909 | 2/1966 | Graves et al. | 119/45 |
| 3,292,583 | 12/1966 | Peterson | 119/45.3 |
| 5,058,530 | 10/1991 | Van De Ven | 119/48 |

FOREIGN PATENT DOCUMENTS

| | | | |
|---|---|---|---|
| 2616622 | 12/1988 | France | 119/45.1 |
| 8702668 | 2/1989 | Netherlands | 119/45.1 |

*Primary Examiner*—John G. Weiss
*Attorney, Agent, or Firm*—Mason, Fenwick & Lawrence

[57] ABSTRACT

An elongated plural nest section for a poultry nesting system providing nests arranged as a plurality of like modular sections. Each section is an elongated enclosure providing the nests with front access openings. A lifting at a rear edge portion of the nest bottoms that collectively raises all the nest bottoms about a front axis from a lowered laying position to an elevated upwardly tilting expulsion position to eject poultry from the nests. A nest access controlling wire gate/trip for the access opening of each nest to be swung downwardly from a first open position to a blocking second during passage of a hen into the nest. A time controlled motor and cable arrangement swings the nest bottoms concurrently to an upwardly titled expelling position and returns the gate/trip assembled to the said first positions.

20 Claims, 4 Drawing Sheets

AUTOMATIC TURKEY NESTING APPARATUS

BACKGROUND AND OBJECTS OF THE INVENTION

The present invention relates in general to automatic turkey nesting and egg gathering apparatus, and more particularly to a side-by-side array of a plurality of turkey nesting bays or nesting chambers having a trap and tripping wire gate structure controlling entry access to each of the associated nest bays together with a hen-ejecting means formed by a pivoted bottom for each bay, and a timed motor, cable and rail structure for concurrently raising the bottoms and concurrently shifting the wire gate structure to an open position for the whole array of nesting bays to cause the birds to be ejected from the nesting bays they have occupied. An egg collecting system is associated with the turkey nesting apparatus to receive eggs from the nesting bays and deliver them to a processing location.

Heretofore, turkey farming has become increasingly automated by providing laying nest facilities and egg gathering systems which enable poultrymen to maintain and care for larger and larger numbers of laying hens. For example, it is not uncommon for a single poultryman to have under his care as many as 50,000 or more hens. Typically the poultry nesting facilities are provided defining many side-by-side nesting chambers or nesting bays and associated motor operated egg gathering systems. Nesting chambers for such long plural nest devices typically have an open front and a nest-forming bottom wall which tilts toward a margin of the nesting chamber at the front or rear, more commonly adjacent the open front of the nesting chamber. Each nesting chamber is designed to accommodate one turkey hen at a time which enters the cage when it desires to lay an egg. When a hen lays an egg in the nest, the egg is deposited on a nest pad on the bottom panel of the nesting chamber and the egg gently rolls down the titled bottom of the nesting chamber toward the front edge, to be received on a conveyor of an egg collection or gathering system mounted adjacent the front edge of the tilted bottom wall. The eggs are then carried to a cleaning and packaging area by means of the conveyor belt as part of the egg collection system. A number of problems have been encountered in connection with such prior art structures such as hen injury caused by hens becoming trapped adjacent edges of the moveable bottom during its hen ejection motion and by structures which permit entry of a second hen into a nesting chamber while the chamber is already being occupied by a laying hen or by a hen which has already laid an egg but is attempting to remain sitting on the egg in order to hatch it.

An object of the present invention is the provision of a plural turkey or other fowl nesting device of the type previously described, having a special pivoted wire gate structure and mounting mechanism which, when a bird goes into the nest, closes the front access opening to the nesting bay behind the hen so that a second bird cannot get into the nesting bay while the first hen is still in the bay.

Another object of the present invention is the provision of a novel plural turkey or other fowl nesting system defining a long side-by-side array of individual nesting chambers, arranged in plural chamber modules or sections, each chamber having a wire gate structure of the type described in the preceding paragraph associated therewith, together with a hinged bottom on which the hen lays the egg. A cyclically operated timed motor, cable and connecting structure are provided for concurrently raising the bottoms of all of the nesting bays at selected time intervals to ensure all hens are expelled and that any eggs which have not rolled down the inclined nesting bay bottom to the egg collecting facility when the bottom occupies its normal position are deposited on the conveyor mechanism of the egg gathering system.

Another object of the present invention is the provision of a plural turkey or other fowl nesting system as described in any of the two immediately preceding paragraphs, wherein the nest bottoms are tilted upwardly and the wire gate structures shifted to the open position at a low selected speed to eject the birds from the nest slowly and easily so they will not be stressed, and wherein the tiltable bottom structure is then returned quickly to the normal lowered position while the cage structures remain in the open position to encourage additional turkeys to enter the nesting bays.

Other objects, advantages and capabilities of the present invention will become apparent from the following detailed description taken in conjunction with the accompanying drawings illustrating a preferred embodiment of the invention.

DETAILED DESCRIPTION OF THE PREFERRED EMBODIMENT

Figure 1:
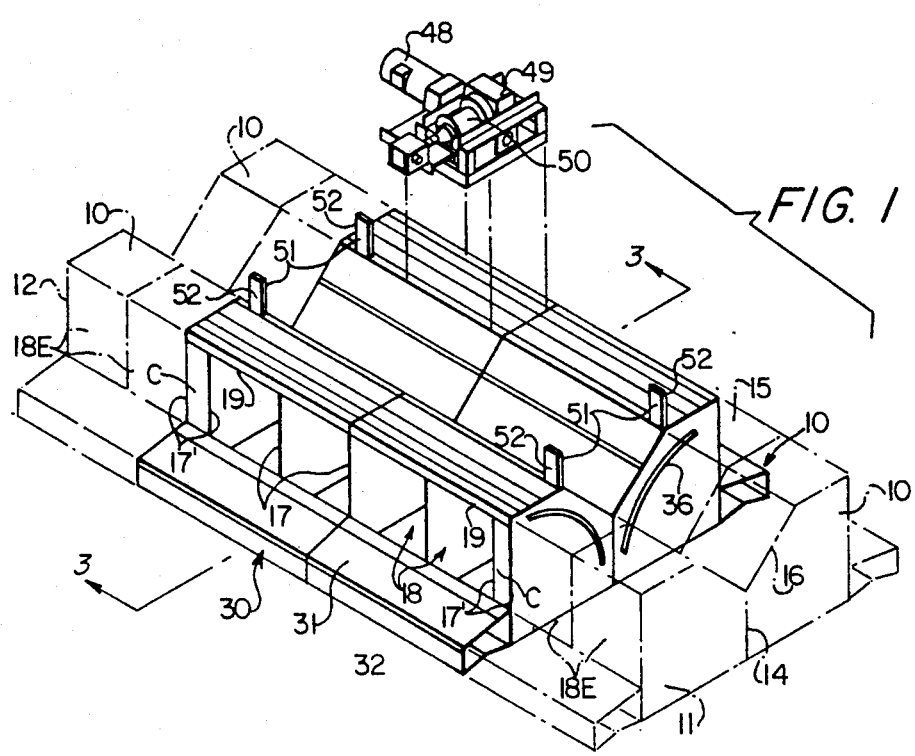
FIG. 1 is a front perspective view of a housing of an automatic plural poultry nesting apparatus formed as a double row installation embodying the present invention but not illustrating the gate means employed at the entrance to each nest.

Referring to the drawings, wherein like reference characters designate corresponding parts throughout the several figures, the device of the present invention may be described as a transversely or laterally elongated plural turkey nesting structure having a large number of individual stalls or chambers herein usually referred to as nests or nesting bays, arranged in a side-by-side array or row to receive turkey hens individually in the respective nests when they are ready to lay eggs. The apparatus shown as a double row installations in FIG. 1, can be provided in single row as well as double row installations. Each row is formed of an elongated plural nest section assembly 10, having eight nests or bays 18, usually formed of sheet metal and metal reinforcing components. Only the four internal nest bays 18 are illustrated in FIG. 1 in solid lines with two end units 18E respectively provided on each end being illustrated in dashed lines for the sake of clarity. Each nest section assembly 10 includes a pair of end walls or panels 11, 12, a bottom housing panel 13 joined at its opposite lateral edges to the vertical end walls or panels 11, 12, together with a lower vertical rear wall portion 14. A front top wall portion 15, and an upwardly and forwardly inclined upper rear wall portion 16, are provided, each formed of separate panels joined by conventional means at their longitudinal edges, defining the back and top of each nest or nesting bay.

A plurality of a vertical intermediate partitions also formed of sheet metal panels indicated at 17 which are arranged parallel to and inwardly spaced from the end walls 11 and 12 and are spaced apart individually to define the side-by-side array of individual nests or bays 18 and 18E. Closely spaced side-by-side pairs of panels 17', identical to panels 17, are provided between the second and third bays and the seventh and eighth bays to provide cable housing chambers C for lift cables which are operable to tilt the floor of each nest or bay for ejecting the hen in a manner to be later described. In one satisfactory example, each module or section 10 may be 10 feet long with the nesting bays 15 inches wide, thus providing eight nesting bays 18 for each section or module 10.

The profile or side elevational shape of the vertical intermediate partitions 17 and 17' is substantially identical to that of the end panels 11, 12 to form dividers between the respective nests 18. As will be apparent from the drawings, these nests or nesting bays 18 are open at their front, as indicated at 19, and are closed at the top, rear, and sides of each nest by the panels 14, 15 and 16, and either end walls 11, 12 or the intermediate panels 17 or 17'. In the illustrated embodiment, reinforcing plates 20, corner angle irons 21, and channel members 22 are fixed to the sheet metal panels at the locations indicated to rigidify and reinforce the structure.

The bottoms of the nests or nesting bays 18 are each respectively provided with upwardly swinging or pivotally moveable nest bottom structures 23, pivotally assembled for movement about the axis of a long transversely extending pivot tube 24 spanning the transverse length of the housing 10. Each bottom structure is pivotally moveable from the lowered normal nesting position of FIG. 3 to the raised hen expulsion position of FIG. 4 in a manner later to be described. The nest bottom structures 23 are of a width to substantially laterally span the full width of the associated nest 18 and extend from the pivot tube 24 located near the front lower corner of the housing 10 to a location closely adjacent the rear wall panel 14, and in the preferred embodiment shown are each formed of a flat rectilinear base panel 25 underlying a nest pad 25a of somewhat resilient or flexible sheet material on which the eggs are deposited by the hens.

A suitable structure for pivotally connecting the bottom 23 onto the pivot tube 24 is illustrated, wherein the bottom panel 25 forming the base of the nest bottom structure 23 has a channel member or channel shaped brackets 26 fixed to its forwardmost end along the front edge thereof providing channel sides which embrace the pivot tube 24 above and below the pivot tube so that the panel 25 may swing about the longitudinal axis of the pivot tube while restraining the nest bottom 23 assembly thereon. A bridge chute 27 in the form of a grid-like rod structure with up-turned lateral edge portions is pivotally mounted along is rearmost edge portion on base 25 to a portion of the front edge portion of the base panel 25 to bridgingly span the space between the pivot tube 24 and the lower left end portion of the egg tray 29 for the egg conveyor assembly 30. The forwardmost edge (the right-hand edge in FIG. 3) of the chute 27 loosely bears upon and is slidable on the upwardly facing surface of the egg tray 29 which, collectively with the egg tray cover 31 and front wall panels 32, form an enclosure about a conveyor belt (not shown) having an upper flight or reach which receives the eggs. The conveyor operates in a known manner to carry the eggs to a suitable collecting table or processing location. The eggs are delivered to the conveyor gravitationally, and move forwardly and downwardly along the sloping nest bottom structure 23 and chute 27 onto the conveyor.

Figure 3:
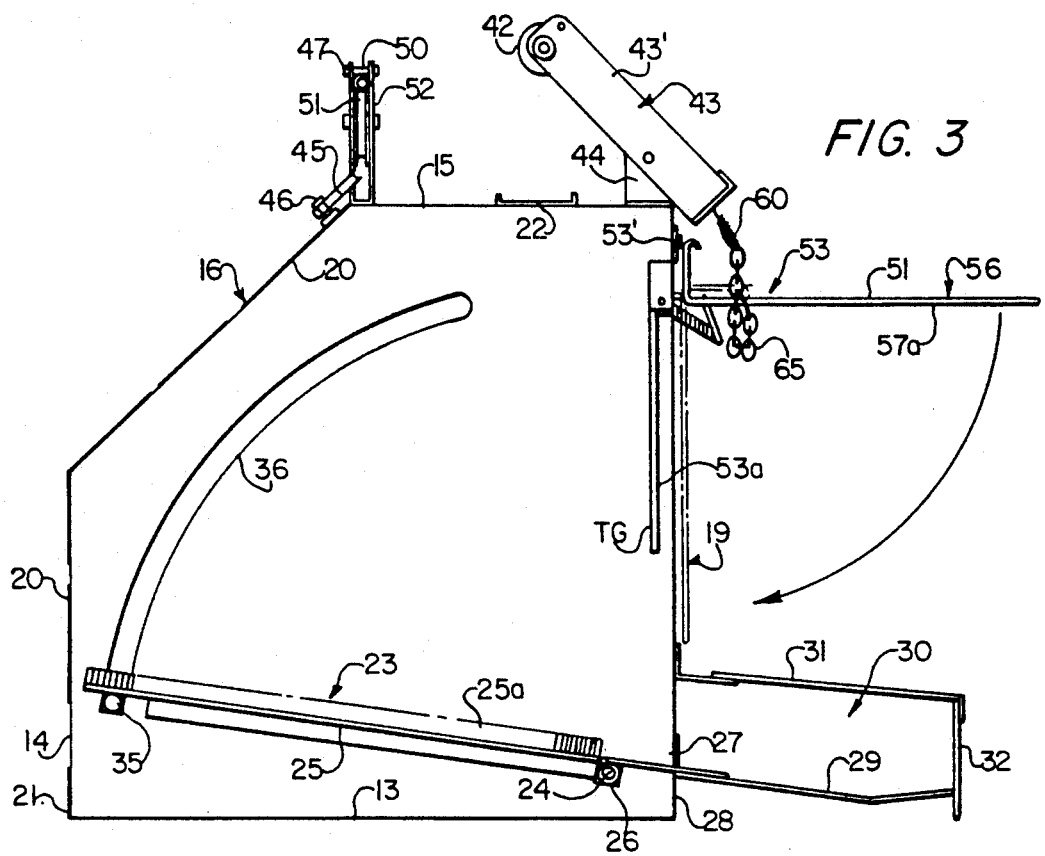
FIG. 3 is a vertical transverse section view taken along the line 3—3 of FIG. 1, showing the tiltable bottom and the wire entry control gate structure in normal horizontal position and with the entry control gate structure in the raised horizontal position in solid lines for permitting entry of the next hen into the nesting bay and also showing the gate in dotted lines in its lower closed vertical position to preclude entry of a hen into the nesting bay.
Figure 4:
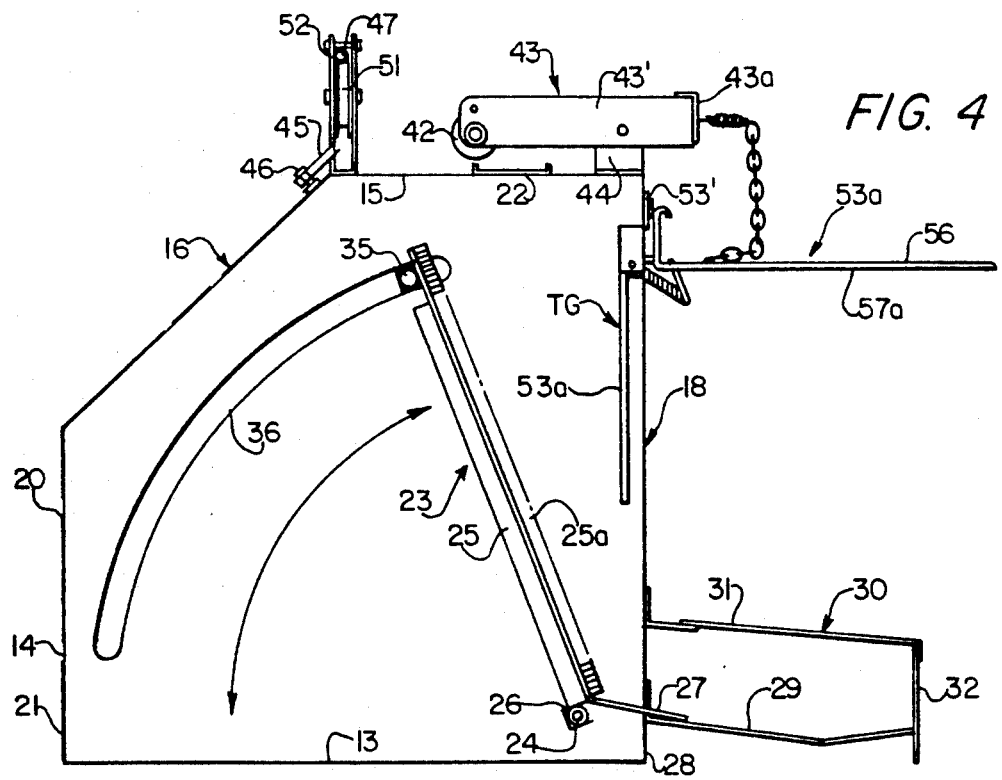
FIG. 4 is a vertical transverse section view similar to FIG. 3, but showing the tiltable bottom and the wire gate structure and the motor and cable operated mechanism therefore in the expulsion position.

The pivotally mounted nest bottom structure 23 of the plurality of nest bays 18 are effectively ganged together for concurrent movement as a group between the lowered normal position of FIG. 3 and the expulsion position of FIG. 4. Such movement is effected by an elongated lifting tube 35 of a length sufficient to span the entire length of the associated module or section of nest bays 18 of the plural nest unit. The back end portions of the base panels 25 rest on lifting tube 35 and are secured in any desired manner to the lifting tube, and the lifting tube 35 extends through aligned arcuate elongated slots 36 in the end panels 11, 12 and intermediate partitions 17 and 17'. The slots 36 have a width slightly more that the tube 35 so that the tube 35 can easily move the length of slots 36 between the lowered normal position of the FIG. 3 and the expulsion position of FIG. 4 along an arcuate path whose center of curvature coincides with the longitudinal axis of the pivot tube 24. Slots 36, as will be well understood, are provided in each of the intermediate partitions 17 and 17' as well as the end walls 11, 12 of the plural nest housing 10 and lifting tube 35 extends outwardly of the end walls 11, 12 a short distance.

Figure 6:
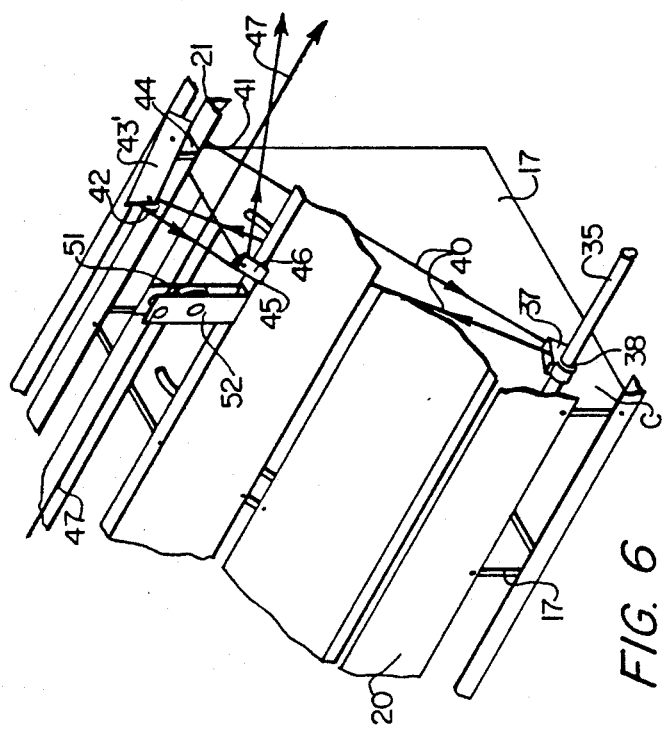
FIG. 6 is a somewhat diagrammatic fragmentary perspective showing the nest bottom lift cable drive assembly.
Figure 7:
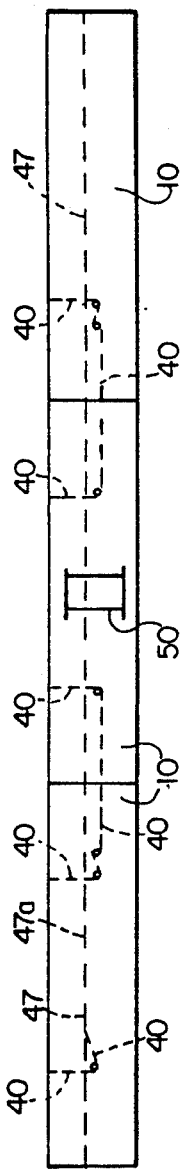
FIG. 7 is a top diagrammatic view illustrating the lift cable attachment to the drive cable for operating plural section rows of plural modules, in one example.

Movement of lifting tube 35 is effected at plural locations in the cable chambers between panels 17' by identical means in each chamber C including a pulley 37 (FIG. 6) provided on a U-shaped pulley mounting bracket 38 which is fixed to the portions of the lift tube 35 lying in the chambers C between panels 17'. The positioning of these power driven components in chambers C protects the hens from injury.

Figure 2:
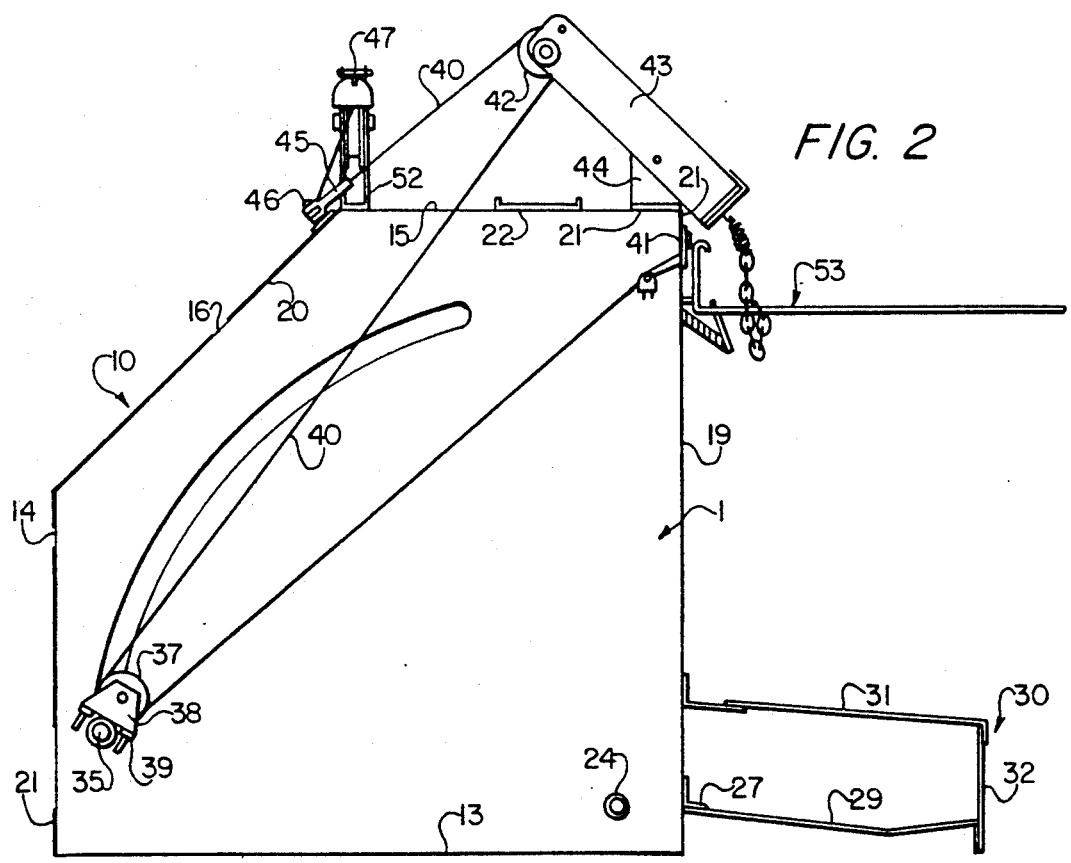
FIG. 2 is an end elevational view of a single row version of the apparatus, showing the entry control gate in open position and a portion of drive and lift cable means.

A lift cable 40 extends over pulley 37 and has a fixed end 41 attached to the upper front corner angle iron 21 of the nest housing. Cable 40 also extends around a pulley 42 journaled at the upper end of a pivoted swinging trip arm assembly 43 (FIG. 3). Trip arm assembly 43 includes a pair of spaced parallel trip arms 43' pivotally mounted in an upstanding mounting bracket 44 extending outwardly from the top wall portion 15 of the housing. The cable 40 after passing around the pulley 42 is then trained about an idler pulley 45 mounted near the rear end of the straight portion 15a of top wall portion 15, on a mounting bracket 46 for connection of the end of each cable 40 to a main drive cable 47 running lengthwise of the nesting section or module. One of the cables 40 and the associated pulleys 37, 42 and 45 are best diagrammed in FIGS. 2 and 6.

A drive motor 48, gear reducer 49 and winch drum 50 (FIG. 1) are provided on top of the line of plural nesting bays for each row of nests with the winch drum 50 arranged perpendicular to the cable travel line of drive cable 47 aligned with and engaging main guide pulleys 51 journaled in brackets 52 fixed to and extending upwardly from the top 15. The main drive cable 47 is formed of two drive cable portions 47a, 47b (FIG. 1) extending the length of the plural section line of nests, each drive cable 47a, 47b being secured at an inner end midway of the length of the row of nests to the associated winch drum 50 and the outer ends of each being secured to some kind of a tension applying system, such as training the cables 47a, 47b about pulleys mounted on the end-most housing sections 10 and secured to the roof truss for attachment to weights applying appropriate tension to the cables. The ends of the lift cables 40 are secured at one end to the main drive cable 47 after passing about the associated idler pulley 45 for lifting the lift tube 35 and nest bottoms 23 in unison.

Figure 5B:
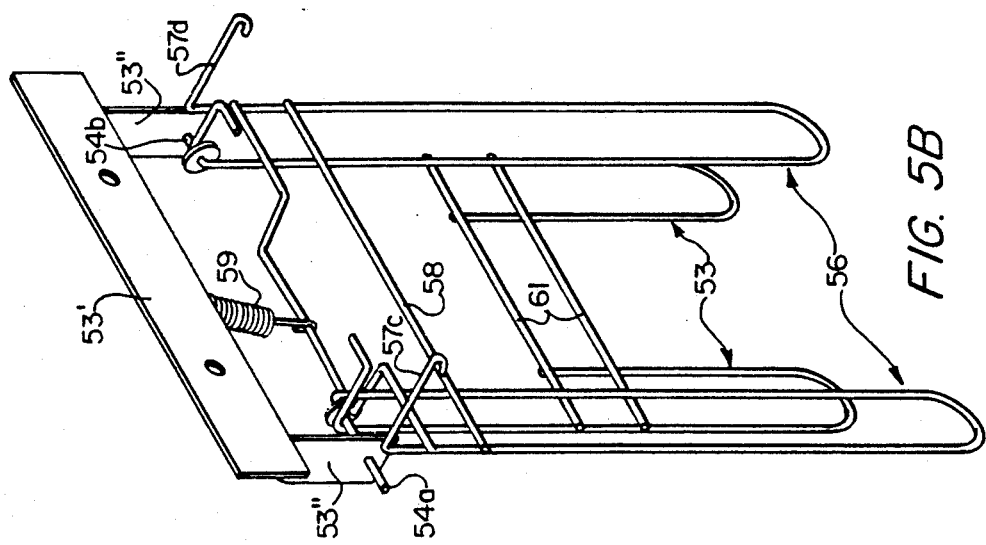
FIG. 5B is a perspective view similar to FIG. 5B but illustrating the entry control gate in its vertical activated or closed position for precluding entry of a hen into the nest.

Mounted in the entrance opening 19 of each of the nesting bays or stalls 18 is a nest access controlling assembly including a gate 53, shown best in FIGS. 3, 4 and 5. Each gate 53 comprises an upper mounting angle member 53' to be fixed to the upper front corner 21 of the nesting section 10 and having downwardly extending ear formations 53" having aligned apertures pivotally receiving and supporting upper pivot rod portions 54a and 54b of an entry control gate 56. More specifically, a first major component of gate 53 is an entry control gate 56 which includes a pair of elongated U-shaped members 57a, 57b, formed of rigid wire construction. U-shaped members 57a and 57b are held in parallel spaced relation to one another by a first member comprising a bail shaped cross rod 58a having a u-shaped center with an offset linear portion 58' and a second member comprising a linear rod 58b. U-shaped members 57a and 57b respectively include the outwardly extending pivot rods 54a and 54b which are loosely received in apertures in the downwardly extending ear formations 53" so that entry control gate 56 is swingingly supported by ear formations 53".

The second major component of gate 53 is a trip gate TG having a pair of U-shaped members 53a and 53b connected by horizontal connector rods 61. The outer legs 62 and 63 of U-shaped members 53a and 53b extend upwardly and forwardly over the upper surfaces of pivot rods 54a and 54b respectively and are welded to hinge member washers 53c which are mounted for pivotal movement on pivot rods 54a and 54b. It will consequently be apparent that trip gate TG is swingingly supported by pivot rods 54a and 54b.

Figure 5A:
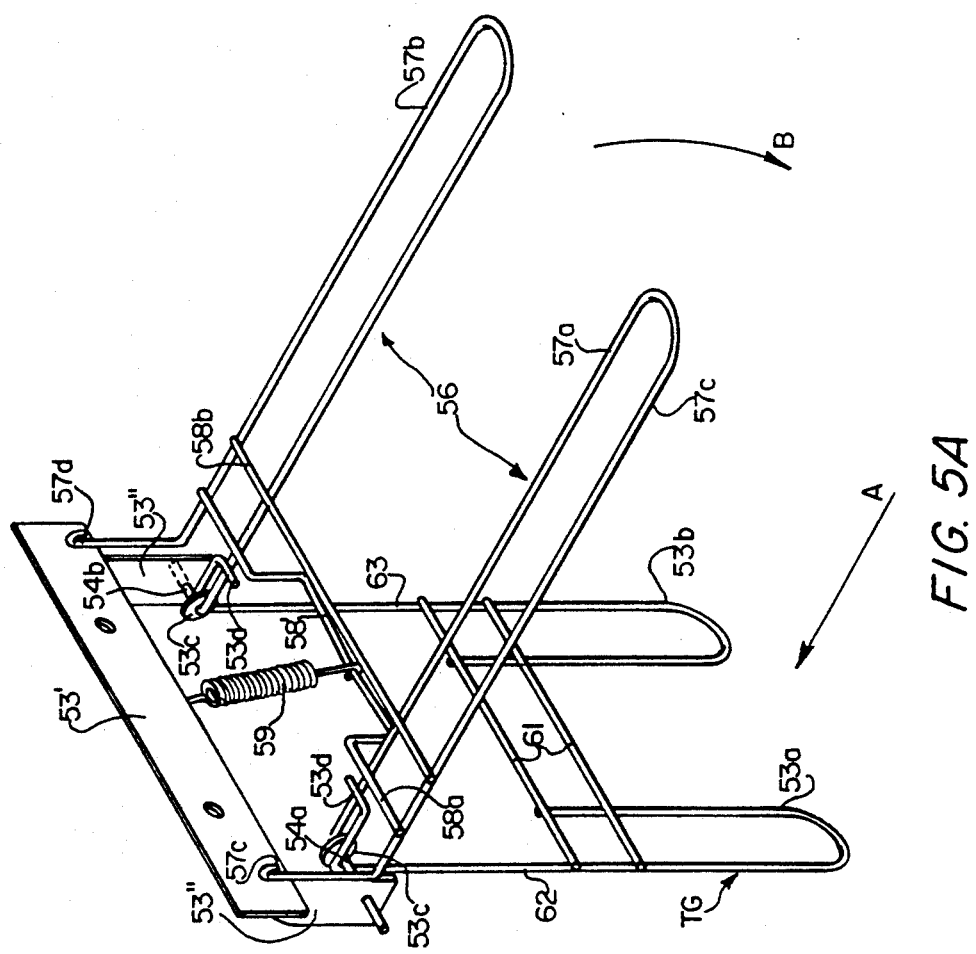
FIG. 5A is a diagrammatic perspective view of one of the wire gates associated with the entrance of a nesting bay with the entry control gate being in its upper.

The forwardmost extent of rods 62 and 63 comprises trip members 53d which are positioned above the inner legs 57a and 57b of entry control gate 56 as shown in FIG. 5A. The upper ends of the outermost rod portions 57c, 57d of the entry control gate 56 are disposed at an outwardly extending angle and abut the vertical plate portion of the mounting member 53' when the entry control gate is in its upper open position as shown in FIG. 3 of the drawings. A tension spring 59 is secured at one end to the U-shaped mid-portion 58' of cross rod 58a while the other end of the spring is attached to a mid-portion of mounting member 53'. Another spring 60 is connected at its outer end to a chain 65 which is secured at one end to cross rod 58b. The inner end of chain 60 is connected to an angle iron lift bar 43a on the end of trip arm 43. The lift bar 43a spans the length of a whole section or module 10 and is fixed on the pair of trip arms 43' near each end of its associated section.

In operation, the entry control gate 56 is initially in its elevated position of FIGS. 3 and 4 and the turkey hen enters the nest by walking to the left beneath gate 56 and moving into contact with the two U-shaped trip rod formations 53a, 53b of the associated nesting bay or stall, the U-shaped members 57a, 57b of the guard 57 being in an upwardly disposed position as shown in FIG. 3. As the hen passes into the nest, she will push against the U-shaped trip rod formations 53a, 53b causing them to swing in an inwardly and upward direction. When the U-shaped members 53a, 53b swing inwardly and upwardly, the right angle trip extensions 53d engage the upper surfaces of U-shaped members 57a, 57b and press the engaged upper portions of the U-shaped member 57a, 57b to cause them to swing downwardly until they go "over-center" at which point spring 59 ceases to resist the pivotal movement and then urges the entry control gate to its lower position as shown in dashed lines in FIG. 3. It is obvious that the elongated U-shaped members 57a, 57b are capable of angular movement about the axis of end rod portions 54a, 54b. The springs 59, 60 keep both the gate and guard in tension at all times in the FIG. 3 position.

When the turkey hen has laid her egg and chooses to leave the nest, she may press outwardly against the U-shaped trip rod formations 53a, 53b, causing the trip gate components 61, 53a and 53b to abut the members 57a, 57b, and swing the entry control gate 56 sufficiently until U-shaped member 58' goes overcenter and spring 59 snaps gate 56 into its forwardly projecting upward solid line position of FIG. 3, whereupon the nest is ready to receive another turkey hen.

The normal open position of the wire gate structure 53 and the tiltable bottom structure 25 are as shown in FIG. 3, wherein the downwardly extending U-shaped members 53a and 53b hang downwardly in the entrance opening 19 from the washers 53c encircling pivot rods 54a, 54b, and substantially span the height of the entrance opening 19 so as to be engaged by the shoulders or other body portions of a turkey hen entering the associated nesting bay or stall 18. Since the trip gate TG is simply pivotably supported by the washers 53c on the end rod portions 54a, 54b, the gate TG moves freely through an arc from its FIG. 3 position sufficient to cause the trip extensions 53d to swing the barrier or guard formation 56 downwardly sufficiently to cause spring 59 to move it into its vertical depending position shown in FIG. 4 to prevent entry of other turkey hens into that nesting bay while it is still occupied by the first-entering hen. When an egg is laid, it rolls down the bottom structure 25 onto the conveyor belt of the egg conveyor assembly 30 whereupon the egg is then transported lengthwise of the row of nesting bays to the collecting facility. If the hen finishes laying her egg before the expulsion cycle begins, she can press outwardly against the gate and guard formations 53, 56, as described, returning the guard structure 56 to the FIG. 3 position allowing the turkey to leave the nesting bay.

At the conclusion of a chosen timed laying period, a suitable timer mechanism activates the electric drive motor 48 to wind the lift cable portions 47a, 47b, for example, forming the main drive cable 47a, 47b upon the winch drum 50, which draws the lift cables 40 attached to the drive cables 47a, 47b toward the center of the line of modules or nesting bay sections, swinging the arm 43 to the lowered position of FIG. 4 (the broken line position of FIG. 3) to lift the gates 57a and 57b to the FIG. 4 position and also slowly raise the lift rod 35 to swing the nest bottoms 25 upwardly and forwardly about the axis of the pivot tube 24 to the upper canted expulsion position shown in FIG. 4. The distance the bottom 25 travels in the upward direction is controlled by a rotary limit switch (not shown) mounted on the winch drum 50.

It is desirable to eject the birds from the nests slowly and easily so the birds will not be stressed during the expulsion procedure. Once the nest bottoms 25 are in the up position of FIG. 4, the birds are expelled from the nests and the drive direction may then be reversed to lower the bottoms 25, allowing other birds to enter the nesting bays. It is desirable to lower the nest bottoms as fast as possible. Of course, the nest bottom 25 may be used to temporarily block the nest entrance openings when in the up position by suitable adjustment of a conventional timer. The time is preferably set to time out a few seconds after the nest bottoms stop in the up position, to provide a short delay period prior to reversing and returning the nest bottoms to the down position.

I claim:

1. A poultry nesting system comprising a long side-by array of individual chambers defining nests arranged as a plurality of elongated plural nest sections of like modular construction, each section defining an elongated enclosure formed of vertical parallel end and intermediate side panels, top and bottom panels, and a rear wall providing the nests with front access openings to the respective nests along a front side of the enclosure, a hinged nest bottom for each respective nest overlying said bottom panel having an upper surface for receiving eggs thereon laid by the poultry hen occupying the nest, the hinged nest bottoms being tiltable about a common hinge axis member to cause eggs thereon to roll down to an egg discharge opening at the lower front side of the enclosure, a lifting tube member longitudinally spanning each respective section secured to a rear edge portion of the hinged nest bottoms for collectively raising all the nest bottoms of the associated section about the hinge axis member from a laying position to an elevated upwardly tilting expulsion position to eject poultry from the nests, a nest access controlling assembly for each nest pivotally mounted at the top of each access opening comprising a trip gate having a first position normally depending vertically downwardly over the major portion of the height of the access opening and a barrier forming entry control gate portion pivotally linked to the trip rod formation and normally extending horizontally outwardly from the top of the trip rod formation at said first position, the entry control gate portion being swung downwardly to a blocking second position over the access opening upon engagement of a hen with the trip rod formation during passage of a hen into the nest barring entry of a second hen into an already occupied nest, and time controlled poultry ejecting means coupled to said lifting tube member and to the entry control gate for the respective section to raise the lifting tube member about an arc shifting the nest bottoms concurrently to said upwardly tilted expelling position and return the entry control gate to the said first position in accordance with a preselected expelling and laying cycle.

2. A poultry nesting system as defined in claim 1, wherein said poultry ejecting means includes an elongated lift bar spanning the length of the associated section supported above the access openings by pivot mounting means normally supporting the lift bar at a lowered position freeing the gate portions for downward movement responsive to their linkage with the associated gate formation when the latter is displaced rearwardly by engagement with a first hen passing inward through the access opening, the pivot mounting means being raised by the ejecting means coupling therewith during an expulsion cycle to lift all the associated gate portions and restore them to said first positions.

3. A poultry nesting system as defined in claim 1, wherein said poultry ejecting means includes a drive motor and winch drum and cable means secured to the drum and extending about pulleys to the lifting tube member to raise the latter upon winding of the cable on said drum and lift the nest bottoms concurrently to said upwardly tilting expelling position.

4. A poultry nesting system as defined in claim 2, wherein said poultry ejecting means includes a drive motor and winch drum and cable means secured to the drum and extending about pulleys to the lifting tube member to raise the latter upon winding of the cable on said drum and lift the nest bottoms concurrently to said upwardly tilting expelling position.

5. A poultry nesting system as defined in claim 1, wherein said nest access assembly includes a stationary anchoring member at the top thereof and said barrier forming entry control gate portion is formed of rod members including a cross rod near the top thereof fixed to gate rod portions defining the barrier formations which extend outwardly in said first position and downwardly in the blocking second position, and a coil spring tension connecting an offset mid-portion of said cross rod of each respective entry control gate assembly to said anchoring member providing an overcenter spring means retracting said gate portion to occupy a selected downwardly extending angular relation at said second position responsive to inward displacement of the trip rod formation by an entering hen.

6. A poultry nesting system as defined in claim 2, wherein said access controlling assembly includes a stationary anchoring member at the top thereof and said barrier forming entry control gate portion is formed of rod members including a cross rod near the top thereof fixed to gate rod portions defining the barrier formations which extend outwardly in said first position and downwardly in the blocking second position, and a coil spring tension connecting an offset mid-portion of said cross rod of each respective entry control gate assembly to said anchoring member providing an overcenter spring means acting on said gate portion to move it to a selected downwardly extending angular position at said second position responsive to inward displacement of the trip rod formation by an entering hen.

7. A poultry nesting system as defined in claim 4, wherein said access controlling assembly includes a stationary anchoring member at the top thereof and said barrier forming entry control gate portion is formed of rod members including a cross rod near the top thereof fixed to gate rod portions defining the barrier formations which extend outwardly in said first position and downwardly in the blocking second position, and a coil spring tension connecting an offset mid-portion of said cross rod of each respective entry control gate assembly to said anchoring member providing an overcenter spring means retracting said gate portion to occupy a selected downwardly extending angular relation at said second position responsive to inward displacement of the trip rod formation by an entering hen.

8. A poultry nesting system as defined in claim 5, wherein a linking spring and chain connects an upper portion of each respective gate/trip assembly with said lift bar for elevation of the barrier forming gate portion thereof to said first position upon upward movement of the lift bar.

9. A poultry nesting system as defined in claim 7, wherein a linking spring and chain connects an upper portion of each respective gate/trip assembly with said lift bar for elevation of the barrier forming gate portion thereof to said first position upon upward movement of the lift bar by winding of the cable means on the winch drum.

10. A poultry nesting system as defined in claim 8, wherein said trip gate is pivoted on rod portions of the access control gate portion near the top thereof to be freely rotatable thereon and includes abutment shoulder means engagable with the gate portion to shift the latter from said first position toward said second position upon rearward displacement of the trip rod formation during hen entry into the nest.

11. A poultry nesting system as defined in claim 9, wherein said trip gate is pivoted on rod portions of the gate portion near the top thereof to be freely rotatable thereon and includes abutment shoulder means engagable with the gate portion to shift the latter from said first position toward said second position upon rearward displacement of the trip gate during hen entry into the nest.

12. An elongated plural nest section for a poultry nesting system comprising a long side-by array of individual chambers defining nests arranged as a plurality of like modular sections, each section defining an elongated enclosure formed of vertical parallel end and intermediate side panels, top and bottom panels, and a rear wall providing the nests with front access openings to the respective nests along a front side of the enclosure, a hinged nest bottom for each respective nest overlying said bottom panel having an upper surface for receiving eggs thereon laid by the poultry hen occupying the nest, the hinged nest bottoms being tiltable about a common hinge axis member to cause eggs thereon to roll down to an egg discharge opening at the lower front side of the enclosure, a lifting tube member longitudinally spanning the associated section secured to a rear edge portion of the hinged nest bottoms for collectively raising all the nest bottoms of the associated section about the hinge axis member from a laying position to an elevated upwardly tilting expulsion position to eject poultry from the nests, a nest access controlling assembly for each nest pivotally mounted at the top of each access opening comprising a gate having a first position normally depending vertically downwardly over the major portion of the height of the access opening and a barrier forming entry control gate portion pivotally linked to the trip rod gate and normally extending horizontally outwardly from the top of the trip rod formation at said first position, the entry control gate portion being swung downwardly to a blocking second position over the access opening upon engagement of a hen with the trip gate during passage of a hen into the nest barring entry of a second hen into an already occupied nest, and time controlled poultry ejecting means coupled to said lifting tube member and collectively to the entry control gate to raise the lifting tube member about an arc shifting the nest bottoms concurrently to said upwardly titled expelling position and return the entry control gate to the said first positions in accordance with a pre-selected expelling and laying cycle.

13. A plural nest section for a poultry nesting system as defined in claim 12, wherein said poultry ejecting means includes an elongated lift bar spanning the length of the associated section supported above the access openings by pivot mounting means normally supporting the lift bar at a lowered position freeing the entry control gate portions for downward movement responsive to their linkage with the associated gate formation when the latter is displaced rearwardly by engagement with a first hen passing inward through the access opening, the pivot mounting means being raised by the ejecting means coupling therewith during an expulsion cycle to lift all the associated gate portions and restore them to said first positions.

14. A plural nest section for a poultry nesting system as defined in claim 13, wherein said poultry ejecting means includes a drive motor and winch drum and cable means secured to the drum and extending about pulleys to the lifting tube member to raise the latter upon winding of the cable on said drum and lift the nest bottoms concurrently to said upwardly tilting expelling position.

15. A plural nest section for a poultry nesting system as defined in claim 14, wherein said gate assembly includes a stationary anchoring member at the top thereof and said barrier forming entry control gate portion is formed of rod members including a cross rod near the top thereof fixed to gate rod portions defining the barrier formations which extend outwardly in said first position and downwardly in the blocking second position, and a coil spring tension connecting an offset mid-portion of said cross rod of each respective entry control gate assembly to said anchoring member providing an overcenter retracting of said entry control gate portion to a selected downwardly extending angular relation defining said second position responsive to inward displacement of the trip rod formation by an entering hen.

16. A plural nest section for a poultry nesting system as defined in claim 15, wherein a linking spring and chain connects an upper portion of each respective gate/trip assembly with said lift bar for elevation of the barrier forming entry control gate portion thereof to said first position upon upward movement of the lift bar by winding of the cable means on the winch drum.

17. A plural nest section for a poultry nesting system as defined in claim 16, wherein said trip gate is pivoted on rod portions of the entry control gate near the top thereof to be freely rotatable thereon and includes abutment shoulder means engagable with the entry control gate portion to shift the latter from said first position toward said second position upon rearward displacement of the trip rod formation during hen entry into the nest.

18. A poultry nesting system as defined in claim 14, wherein portions of said lifting tube member near opposite ends thereof and a rearmost end of said pivot mounting means supporting said lift bar have pulleys about which a lift cable for each respective section forming part said cable means are trained, and the cable means, including a main cable extending longitudinally over the length of the modular sections forming a whole nesting system line of such sections, an end of each said pair of lift cables for sections being secured respectively to said main cable to be moved by the main cable when the latter is wound up on the lift drum for concurrently lifting the nest bottoms and the associate lift bar during the expulsion cycle.

19. A poultry nesting system as defined in claim 15, wherein portions of said lifting tube member near opposite ends thereof and a rearmost end of said pivot mounting means supporting said lift bar have pulleys about which a lift cable for each respective section forming part said cable means are trained, and the cable means, including a main cable extending longitudinally over the length of the modular sections forming a whole nesting system line of such sections, an end of each said pair of lift cables for sections being secured respectively to said main cable to be moved by the main cable when the latter is wound up on the lift drum for concurrently lifting the nest bottoms and the associate lift bar during the expulsion cycle.

20. A poultry nesting system as defined in claim 16, wherein portions of said lifting tube member near opposite ends thereof and a rearmost end of said pivot mounting means supporting said lift bar have pulleys about which a lift cable for each respective section forming part said cable means are trained, and the cable means, including a main cable extending longitudinally over the length of the modular sections forming a whole nesting system line of such sections, an end of each said pair of lift cables for sections being secured respectively to said main cable to be moved by the main cable when the latter is wound up on the lift drum for concurrently lifting the nest bottoms and the associate lift bar during the expulsion cycle.

* * * * *